(No Model.)

F. E. IVES.
COMPOSITE HELIOCHROMY.

No. 432,530.   Patented July 22, 1890.

Witnesses:
Alfred Rigling
Francis Leclère

Inventor
Fredric Eugene Ives,
By Wm. B. Cooper,
Att'y.

UNITED STATES PATENT OFFICE.

FREDERIC EUGENE IVES, OF PHILADELPHIA, PENNSYLVANIA.

COMPOSITE HELIOCHROMY.

SPECIFICATION forming part of Letters Patent No. 432,530, dated July 22, 1890.

Application filed February 7, 1890. Serial No. 339,584. (No model.)

*To all whom it may concern:*

Be it known that I, FREDERIC EUGENE IVES, a citizen of the United States, residing in the city and county of Philadelphia, State of Pennsylvania, have invented an Improvement in Composite Heliochromy, of which the following is a specification.

My invention consists, first, in a method of producing a set of photographs of an object or landscape which can be subsequently used for the production of a heliochromic picture, and, second, in a method of producing a heliochromic picture upon a screen by means of the said photographs, although they are also adapted to be used in the production of heliochromic pictures by means of pigments.

Figure 1:
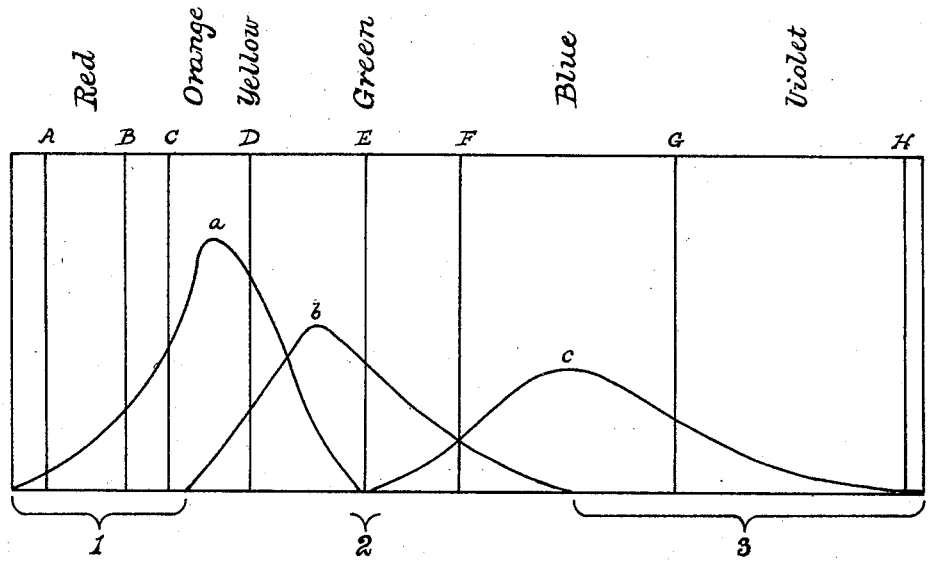
Figure 2:
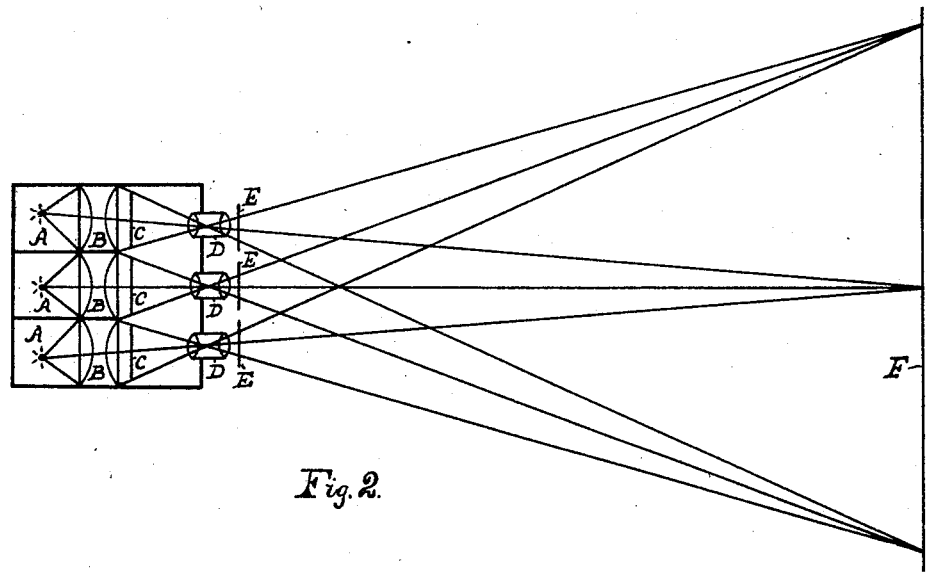

In the accompanying drawings, Figure 1 shows the spectrum, and Fig. 2 is a vertical view of the lantern for the production of the picture on a screen.

In order that my invention may be understood, it is necessary to explain the modern theory which distinguishes between primary spectrum colors and primary color sensations. According to this theory, which is fully stated in recent text-books on color, there are three primary color sensations—red, green, and blue—and only certain narrow and widely-separated portions of the spectrum are capable of producing these strictly primary color sensations. All other parts of the spectrum excite two primary sensations simultaneously in varying degrees of proportions, and produce compound color sensations, as of orange, yellow, yellow-green, and blue-green. In short, the visible spectrum does not consist of three or seven or other limited number of primary colors and mixtures thereof, as taught in older text-books, but of thousands of different primary rays, each of which excites one or more of the three primary color sensations in definite degrees or proportions.

My plan, based upon the above theory, may be described as follows: Three photographs are to be made from each subject to be reproduced in such a manner that each photograph represents by its light and shade the degree to which light coming from different portions of the subject excites a single primary color sensation in the eye. These three photographs are then to be projected simultaneously upon a screen, each by light which excites only the primary color sensation which it represents and in such manner that the three colored images are exactly superimposed and combined to appear as one picture, which should produce exactly the appearance of the object photographed, both as to light and shade and color. This involves, first, the production of one photograph by the joint action of the red, orange, yellow, and yellow-green spectrum-rays, but chiefly by the orange to represent the effect upon the red sensation; another by the joint action of the orange, yellow, yellow-green, green, and green-blue rays, but chiefly by the greenish-yellow rays to represent the effect upon the green sensation; another by the joint action of the blue-green, blue, and violet rays, but chiefly by the blue rays, to represent the effect upon the blue sensation, and, second, the projection of the first photograph by pure red light, the second by pure green light, and the third by blue-violet light. It may be conveniently carried out in pratice in the following manner: A negative representing the effect of the illuminated object upon the primary red sensation may be made by exposing in the camera a gelatine bromide-of-silver sensitive plate treated with the dye known as "cyanine" and through a light-filter consisting of a collodion film colered to a sufficient depth with aniline-yellow and chrysoidine orange. The character of the sensitive plates and shade of the light-filter should be tested by photographing the solar spectrum, the photograph of which should show an intensity-curve substantially like the curve of a diagram representing the relative power of spectrum rays to excite the primary red sensation, as shown in Fig. 1.

The letters A B C indicate the position of the Fraunhofer lines of the spectrum, and 1 2 3 are spectrum-colors, which represent primary color sensations, because each excite one primary sensation exclusively.

*a b c* are the curves showing the relative power of spectrum-rays to excite the respective primary sensations.

A negative representing the effect of the illuminated object upon the primary green sensation may be made by exposing in the camera a gelatine bromide-of-silver sensitive plate which has been treated with a mixture of the dyes eosine or erythrosine and cyanine and through a yellow light-filter of suitable intensity. The sensitive plates and light-filter for this purpose should also be proved by photographing the spectrum. the negative of which should show an intensity-curve substantially like the curve of a diagram representing the relative power of spectrum-rays to excite the primary green sensation.

A negative representing the effect of the illuminated object upon the primary blue sensation may be made by exposing an ordinary gelatine bromide-of-silver sensitive plate through a double screen of chrysophenine yellow and aniline violet in such proportion as will secure in photographs of the solar spectrum intensity-curves substantially like the curve of a diagram representing the relative power of spectrum-rays to excite the primary blue sensation. By the introduction of minute quantities of other dyes in making the light-filters the intensity-curves may be slightly modified to more exactly accord with the diagrams representing the action of the spectrum upon the primary color sensations. Lantern-slides may be made from these negatives by any of the well-known methods, or the negatives themselves may be transformed into positives by processes known to photographers.

In order to produce a screen-picture from the photographs, a lantern is used in which there are three separate lights and three sets of lenses, so adjusted as to superpose the three images on the screen, the slide representing the red sensation being projected by red light, the one representing the green sensation by green light, and that of the blue sensation by blue-violet light.

In Fig. 2, A A A are the lights; B B B, the condensing-lenses; D D D, the objective lenses. C C C are the slides, and E E E light-filters, while the lines indicate the manner in which the rays are projected on the screen F, by which it may be seen that the same part of each picture is focused at the same point on the screen. The light-filters may be made of suitably-stained gelatine or collodion films or of colored glass.

I claim as my invention—

1. The method of obtaining a set of three photographs for the production of composite heliochromy, which consists in the exposure of one sensitive plate through a light-filter adapted to secure the joint action upon it of the red, orange, yellow, and yellow-green spectrum-rays, with the greatest action by the orange and the least by the deep red and the yellow-green, another through a light-filter adapted to secure the joint action upon it of the orange, yellow, yellow-green, green, and green-blue spectrum-rays, with the greatest action by the yellow-green and the least by the orange and the green-blue, and another through a light-filter adapted to secure the joint action upon it of the blue-green, blue, and violet spectrum-rays, with the greatest action by the blue.

2. A set of three photographs for the production of composite heliochromy, one produced by the joint action upon a sensitive plate of red, orange, yellow, and yellow-green spectrum-rays, but chiefly by the orange, and least of all by the deep red and the yellow-green, another by the joint action of orange, yellow, yellow-green, green, and green-blue, but chiefly by the yellow-green, and least of all by the orange and the green-blue, and another by the joint action of blue-green, blue, and violet, but chiefly by the blue.

3. The method of producing a composite heliochromic picture, which consists in superposing upon a screen the images of three photographs, one produced by the joint action of red, orange, yellow, and yellow-green spectrum-rays, but chiefly by the orange, and least of all by the deep red and the yellow-green, another produced by the joint action of orange, yellow, yellow-green, green, and blue-green spectrum-rays, but chiefly by the yellow-green, and least of all by the orange and the blue-green, another produced by the joint action of blue-green, blue, and violet spectrum-rays, but chiefly by the blue, and projecting the first by red light, the second by green light, and the third by blue-violet light.

4. The method of obtaining a set of three photographs for the production of composite heliochromy, which consists in the exposure of one sensitive plate through a light-filter adapted to secure the joint action upon it of the red, orange, yellow, and yellow-green spectrum-rays, with the greatest action by the orange and the least by the deep red and the yellow-green, another through a light-filter adapted to secure the joint action upon it of the orange, yellow, yellow-green, green, and green-blue spectrum-rays, with the greatest action by the yellow-green and the least by the orange and the green-blue, and another through a light-filter adapted to secure the joint action upon it of the blue-green, blue and violet spectrum-rays, with the greatest action by the blue, the spectrum-rays being made to act upon the plate with an intensity corresponding to their power to excite the primary color sensation which the respective picture is designed to represent.

5. A set of three photographs for the production of composite heliochromy, one produced by the joint action upon a sensitive plate of red, orange, yellow, and yellow-green spectrum-rays, but chiefly by the orange, and least of all by the deep red and the yellow-green, another by the joint action of orange, yellow, yellow-green, green, and green-blue, but chiefly by the yellow-green, and least of all by the orange and the green-blue, and another by the joint action of blue-green, blue, and violet, but chiefly by the blue, the spectrum-rays having been made to act upon the plate with an intensity corresponding to their power to excite the primary color sensation which the respective picture is designed to represent.

6. The method of producing a composite heliochromic picture, which consists in superposing upon a screen the images of three photographs, one produced by the joint action of red, orange, yellow, and yellow-green spectrum-rays, but chiefly by the orange, and least of all by the deep red and the yellow-green, another produced by the joint action of orange, yellow, yellow-green, green, and blue-green spectrum-rays, but chiefly by the yellow-green, and least of all by the orange and the blue-green, another produced by the joint action of blue-green, blue, and violet spectrum-rays, but chiefly by the blue, the spectrum-rays having been made to act upon the plate with an intensity corresponding to their power to excite the primary color sensation which the respective picture is designed to represent, and projecting the first by red light, the second by green light, and the third by blue-violet light.

FREDERIC EUGENE IVES.

Witnesses:
W. H. McCoy,
T. T. Townsend.